US012797950B2

(12) United States Patent
Patry et al.

(10) Patent No.: US 12,797,950 B2
(45) Date of Patent: Nov. 17, 2026

(54) HOUSING AND METHOD OF PREPARING SAME USING A HYBRID CASTING-ADDITIVE MANUFACTURING PROCESS

(71) Applicant: LOCKHEED MARTIN CORPORATION, Bethesda, MD (US)

(72) Inventors: Ryan Patry, Oxford, CT (US); Kishore Kumar Tenneti, Manchester, CT (US); William Paul Fallon, Jr., Wallingford, CT (US); Nathaniel Ferguson Dew, Oxford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 214 days.

(21) Appl. No.: 18/534,882

(22) Filed: Dec. 11, 2023

(65) Prior Publication Data

US 2025/0187073 A1 Jun. 12, 2025

Related U.S. Application Data

(62) Division of application No. 17/544,311, filed on Dec. 7, 2021, now Pat. No. 11,878,343.

(51) Int. Cl.
*B22F 7/08* (2006.01)
*B22D 25/02* (2006.01)
(Continued)

(52) U.S. Cl.
CPC ................ *B22F 7/08* (2013.01); *B22D 25/02* (2013.01); *B22F 5/10* (2013.01); *B33Y 10/00* (2014.12);
(Continued)

(58) Field of Classification Search
CPC .... B22F 5/10; B22F 7/08; B22F 7/062; B22F 10/20; B22F 10/66; B22F 2003/245;
(Continued)

(56) References Cited

U.S. PATENT DOCUMENTS 10,077,499 B2 9/2018 Sullivan et al.
11,878,343 B2 * 1/2024 Patry ......................... B22F 7/08
(Continued)

FOREIGN PATENT DOCUMENTS

CH 658815 A5 * 12/1986 ........... B29C 48/507
CN 105537588 A * 5/2016 ............. B22F 10/80
(Continued)

OTHER PUBLICATIONS

Machine translation of DE 102019201085 A1 obtained on Mar. 6, 2026.*

(Continued)

*Primary Examiner* — Adam D Rogers
(74) *Attorney, Agent, or Firm* — Baker Botts L.L.P.

(57) ABSTRACT

The present disclosure is directed, in certain embodiments, a component of a mechanical apparatus. The component includes a cast body with an initial structure formed by a mold and at least one feature deposited on the cast body using a solid state additive manufacturing process, such that in combination the initial structure and the at least one feature form a complete structure of the component.

20 Claims, 6 Drawing Sheets

(51) Int. Cl.

| | |
|---|---|
| ***B22F 3/24*** | (2006.01) |
| ***B22F 5/10*** | (2006.01) |
| ***B33Y 10/00*** | (2015.01) |
| ***B33Y 80/00*** | (2015.01) |
| ***F16H 57/02*** | (2012.01) |
| ***F16H 57/032*** | (2012.01) |

(52) U.S. Cl.
CPC ......... *B33Y 80/00* (2014.12); *B22F 2003/245* (2013.01); *B22F 2003/247* (2013.01); *F16H 2057/02017* (2013.01); *F16H 57/032* (2013.01)

(58) Field of Classification Search
CPC ... B22F 2003/247; B22D 17/00; B22D 25/02; B22D 31/002; B33Y 10/00; B33Y 80/00; F16H 2057/02017; F16H 57/032
See application file for complete search history.

(56) References Cited

U.S. PATENT DOCUMENTS

| | | | | |
|---|---|---|---|---|
| 12,551,974 | B2 * | 2/2026 | Tracy | B22F 7/062 |
| 2002/0005233 | A1 * | 1/2002 | Schirra | C22C 19/055 148/428 |
| 2016/0010469 | A1 | 1/2016 | Guo | |
| 2017/0274449 | A1 | 9/2017 | Paltry et al. | |
| 2018/0347368 | A1 | 12/2018 | Weaver et al. | |
| 2019/0146456 | A1 | 5/2019 | Czinger et al. | |
| 2021/0123418 | A1 | 4/2021 | Wertz et al. | |

FOREIGN PATENT DOCUMENTS

| | | | | |
|---|---|---|---|---|
| CN | 113385639 A * | 9/2021 | B22C 9/02 |
| DE | 10300966 A1 * | 7/2004 | C23C 24/04 |
| DE | 102019201085 A1 * | 7/2020 | F01D 5/18 |
| WO | WO-2020032964 A1 * | 2/2020 | B23K 35/325 |
| WO | WO-2021143361 A1 * | 7/2021 | B33Y 80/00 |

OTHER PUBLICATIONS

European Office Action corresponding to European Patent Application No. EP22 211 383.9, dated Apr. 24, 2025, 7 pages.

* cited by examiner

HOUSING AND METHOD OF PREPARING SAME USING A HYBRID CASTING-ADDITIVE MANUFACTURING PROCESS

PRIORITY

This application is a divisional, under 35 U.S.C. § 120, of U.S. patent application Ser. No. 17/544,311 filed on Dec. 7, 2021, entitled "Housing and Method of Preparing Same Using a Hybrid Casting-Additive Manufacturing Process," which is incorporated herein by reference.

TECHNICAL FIELD OF THE DISCLOSED SUBJECT MATTER

The present disclosure generally relates to cast components, and more specifically to a housing and method of preparing same using a hybrid casting-additive manufacturing process.

BACKGROUND OF THE DISCLOSED SUBJECT MATTER

Mold assemblies are used in casting processes to form components in a wide range of industries, including the aerospace industry. For example, a sand mold may be filled with a molten metal. After the metal cools and solidifies, the cast component is removed from the mold. The cast component has a shape based on that of the mold. A unique mold is typically needed to create each component's specific structure. However, the cost and lead time for preparing a properly performing mold can be high and long, such that preparing molds for new components can not only be prohibitively costly but can also be a bottleneck that prevents timely project completion. When even a seemingly minor design change is made, complex modification or even a completely new mold needs to be prepared, resulting in further increases in costs and delays.

SUMMARY OF THE DISCLOSED SUBJECT MATTER

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a component of a mechanical apparatus. The component includes a cast body having an initial structure formed by a mold and at least one feature deposited on the cast body using a solid state additive manufacturing process in which a melting temperature of a material of the at least one feature is not reached. The cast body and the at least one feature deposited thereon form a complete structure of the component.

Additionally, the cast body may have an outer surface and an inner surface. The cast body may have a channel defining at least one passage extending from an opening in the cast body to an internal cavity within the cast body defined by the inner surface. The at least one feature may be machined following its deposition to the cast body to form the complete structure of the component. The cast body may include one or more of an aluminum alloy, a titanium alloy, a steel alloy, and a magnesium alloy. In some cases, the cast body and the at least one feature are the same material. In other cases, the cast body and the at least one feature are different materials. The component may be a housing, and the mechanical apparatus may be a gearbox.

Moreover, the cast body may further define a groove in the outer surface having a surface area. At least a portion of the feature may be coupled to the surface area of the groove. The groove may be configured to improve adhesion of the at least one feature to the cast body. The groove may be machined in the cast body following its formation. The groove may be formed by the mold.

Further, the material of the at least one feature is configured to reduce or eliminate galvanic corrosion between the component and a separate structure on which the component is mounted (e.g., aluminum alloy may be used to resist corrosion on an aluminum structure). The at least one feature may be sized and shaped to facilitate connection of the component to a separate structure and may include a first material (e.g., titanium alloy) with a greater mechanical strength than that of a second material of the cast body (e.g., magnesium alloy). The at least one feature may be coupled to the outer surface of the cast body. In some cases, the at least one feature may cover all or a portion of the outer surface of the cast body.

In accordance with another aspect of the disclosed subject matter, a method of preparing a component of a mechanical apparatus includes providing a mold with a geometry configured to prepare an initial structure, preparing, using the mold, a cast body that includes the initial structure, and depositing at least one feature on the cast body using a solid state additive manufacturing process without reaching a melting temperature of the material of the at least one feature.

Moreover, The method may include machining the at least one feature after it is deposited by the solid state additive manufacturing process. The cast body may include one or more of an aluminum alloy, a titanium alloy, a steel alloy, and a magnesium alloy. The cast body and the at least one feature may be the same materials. The cast body and the at least one feature may be different materials.

Further, the method may include forming a groove in an outer surface of the cast body, where the groove has a surface area and depositing at least a portion of the at least one feature within the groove, such that the at least one feature is coupled to the surface area of the groove. The groove may be configured to improve adhesion of the at least one feature to the cast body. The groove may be machined in the cast body following formation of the cast body. The groove may be formed by the mold.

Additionally, the material of the at least one feature may be configured to reduce or eliminate galvanic corrosion between the component and a separate structure on which the component is mounted. The at least one feature may be sized and shaped to facilitate connection of the component to a separate structure, and the at least one feature may include a first material with a greater mechanical strength than that of a second material of the cast body.

Previous casting technology suffers from various drawbacks and limitations, the recognition which are encompassed by this disclosure. For instance, components requiring intricate features can be difficult to obtain using casting alone, because of the difficulty of preparing appropriate molds. These difficulties can result in long, complex, and costly component fabrication processes. In some cases, these limitations act as a bottleneck such that certain desired components cannot practically be fabricated.

Technical advantages of certain embodiments of this disclosure may include one or more of the following. For example, this disclosure improves the throughput and efficiency of fabricating housings, or other components, by uniquely combining casting with solid state additive manufacturing processes. This approach allows components with relatively complex feature, such as internal passageways and intricate exterior features, to be fabricated with decreased assembly times, costs, and overall process complexities. In certain embodiments, this approach provides unprecedented control of material properties at different locations on a fabricated component, for example, by selectively depositing different materials where certain chemical and/or mechanical properties are beneficial. For example, the selective deposition of materials in certain regions of a component can be beneficial because the use of high cost materials can be limited to regions where performance will be most improved, thereby reducing overall cost. Similarly, the use of heavier materials, when beneficial, may be limited to specific regions, thereby reducing overall component weight.

BRIEF DESCRIPTION OF THE DRAWINGS

The subject matter of the application will be more readily understood from the following detailed description when read in conjunction with the accompanying drawings, in which.

DETAILED DESCRIPTION

As described above, previous casting technologies for preparing components of mechanical systems suffer from various drawbacks and limitations, such as relatively low fabrication throughput, limited control of coatings applied to cast components, and long lead times for developing new component designs. The present disclosure is directed, in certain embodiments, to improvements to technology used to prepare such components and the components themselves. For example, the present disclosure includes a component with a cast body comprising an initial structure formed by a mold and at least one feature deposited on the cast body using a solid state additive manufacturing process, such that in combination the initial structure and the at least one feature form a complete structure of the component. Some previous technology has used metal particles or powder to modify the structure of cast components. However, these previous approaches are general less reliable, less reproducible, and slower than the approach described in this disclosure. For example, U.S. Pat. No. 3,450,189 describes a method of coating metal castings with metal particles by applying a slurry of metal particles to a surface of a mold, such that the metal particles adhere to a metal component formed in the mold. This approach allows little or no control to the structure of the features formed by the metal particles and lacks an ability to achieve repeatable features on a cast component. As another example, previous approaches have used cold spraying to add structures to components, but these approaches generally have lower throughput and reproducibility than the approach described in this disclosure. For instance, U.S. Patent Publication No. 20170274449A1, which is incorporated herein by reference in its entirety, describes an approach in which a cold spray applies layers of powdered material to a cast component. U.S. Patent Publication No. 20050084701A1 describes the use of cold spraying to prepare component preforms. U.S. Patent Publication No. 20110078896A1 describes the use of cold spraying to add sections to a rotor. The features deposited by solid state additive manufacturing according to the present disclosure are achieved more rapidly and reproducibly than may be possible with at least certain of these cold spray-based approaches. Furthermore, in certain embodiments of this disclosure, features are deposited at least partially within grooves formed in the cast body, such that the adhesion between additively manufactured features and the cast body are improved over these and other previous manufacturing approaches.

Figure 1:
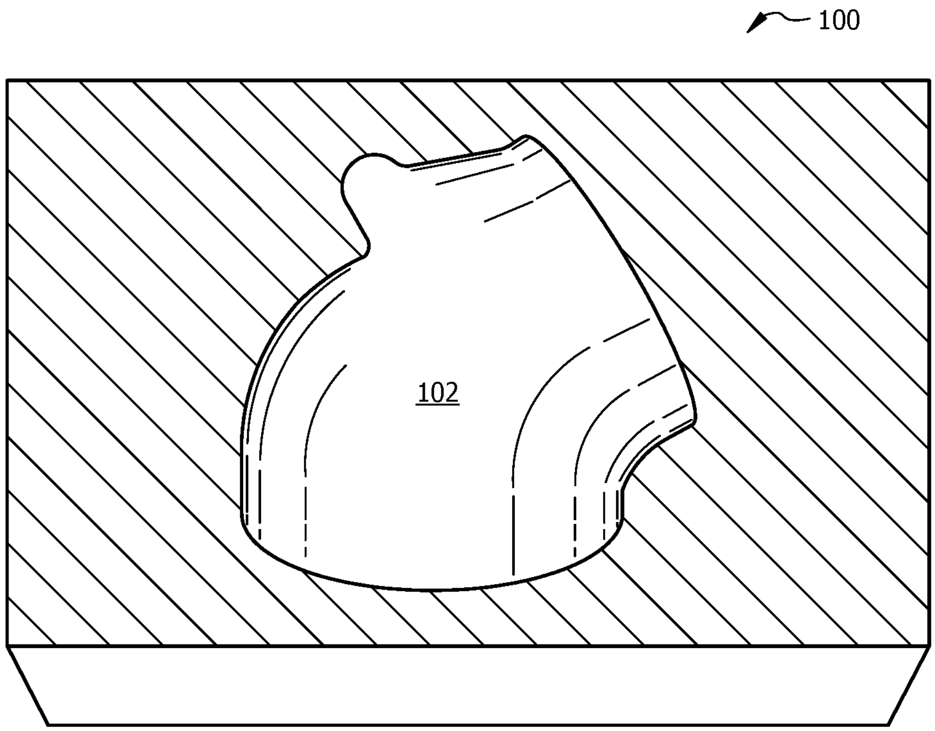
FIG. 1 is a diagram illustrating a mold for casting an initial structure of a component, in accordance with certain embodiments.
Figure 2A:
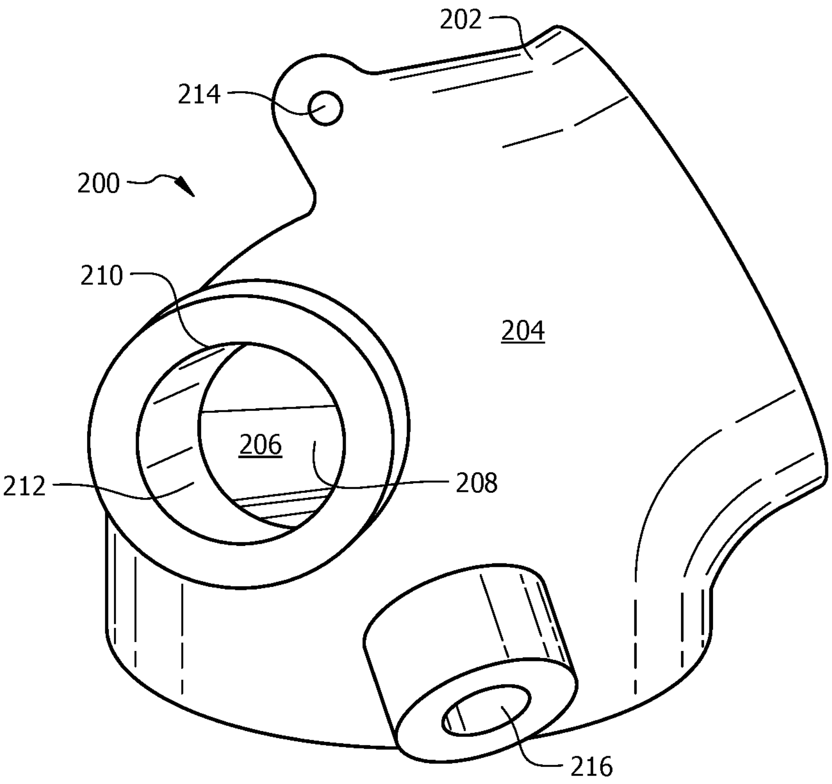
FIG. 2A is a diagram illustrating a cast body formed using a mold such as is illustrated in FIG. 1, in accordance with certain embodiments.
Figure 2B:
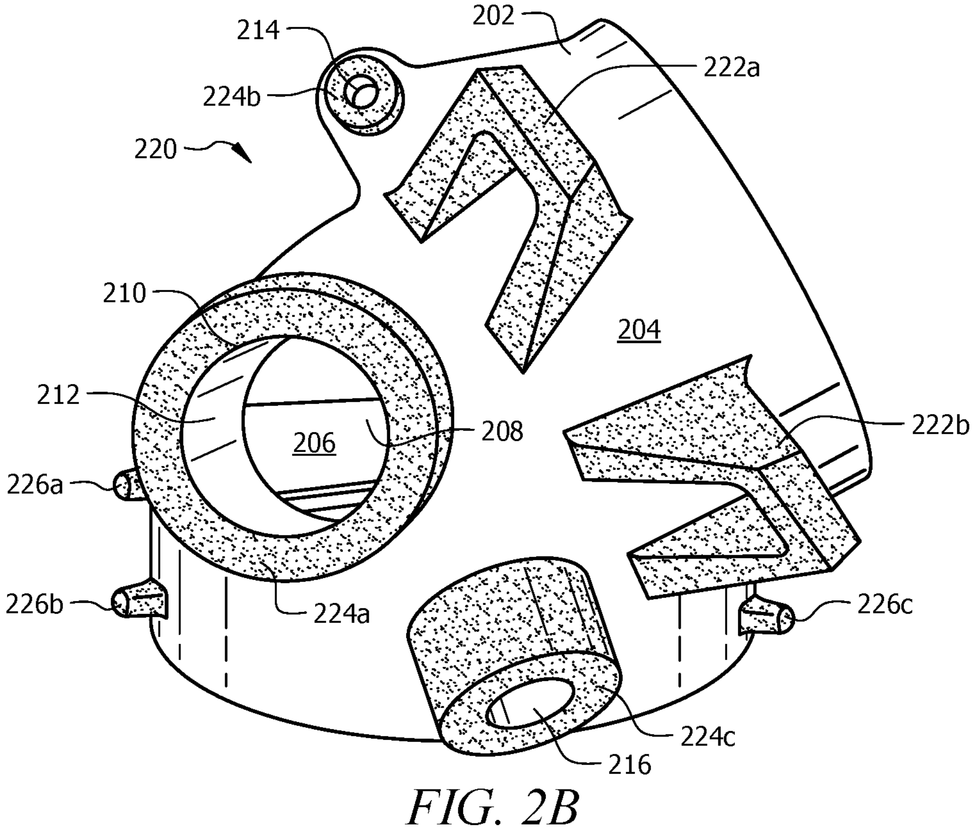
FIG. 2B is a diagram illustrating the cast body of FIG. 2A with features deposited in various regions of the cast body using solid state additive manufacturing, in accordance with certain embodiments.
Figure 2C:
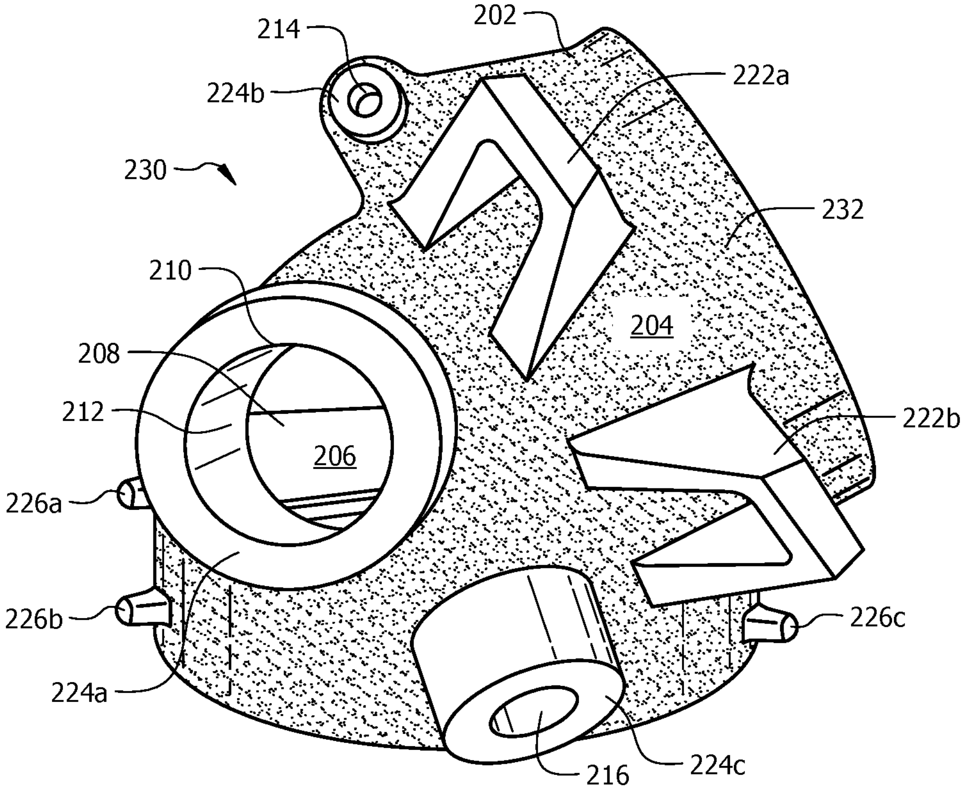
FIG. 2C is a diagram illustrating the cast body of FIG. 2A with features deposited on the outer surface of the cast body using solid state additive manufacturing, in accordance with certain embodiments.
Figure 3A:
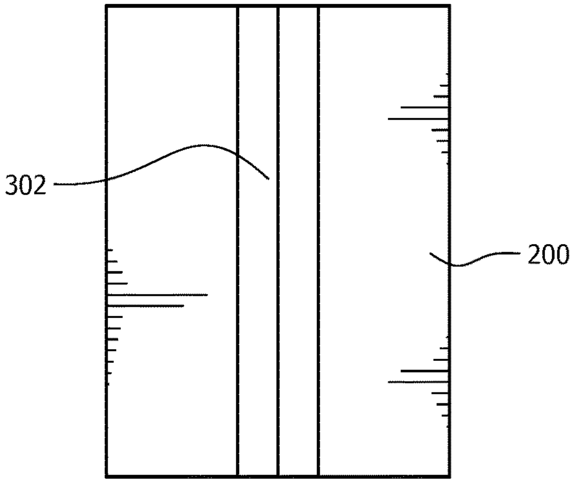
FIG. 3A is a diagram illustrating a groove formed in the cast body from a top down view, in accordance with certain embodiments.
Figure 3B:
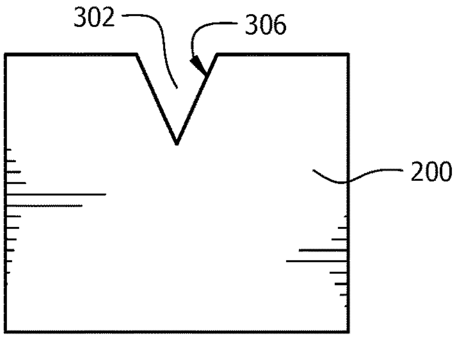
FIG. 3B is a diagram illustrating the groove of FIG. 3A from a side view through a cross section of the cast body, in accordance with certain embodiments.
Figure 3C:
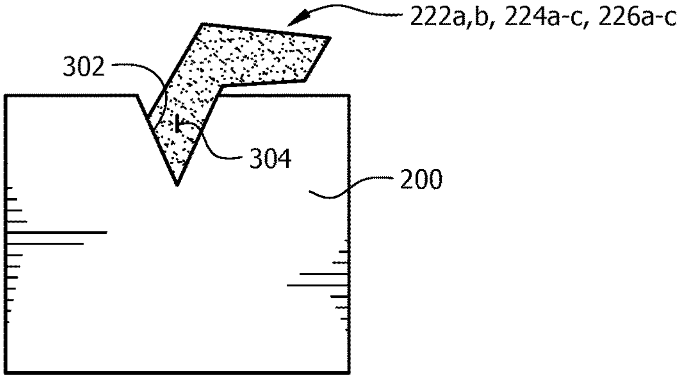
FIG. 3C is a diagram illustrating a feature deposited at least partially in the groove shown in FIG. 3B to improve adhesion between the feature and the cast body, in accordance with certain embodiments.
Figure 4:
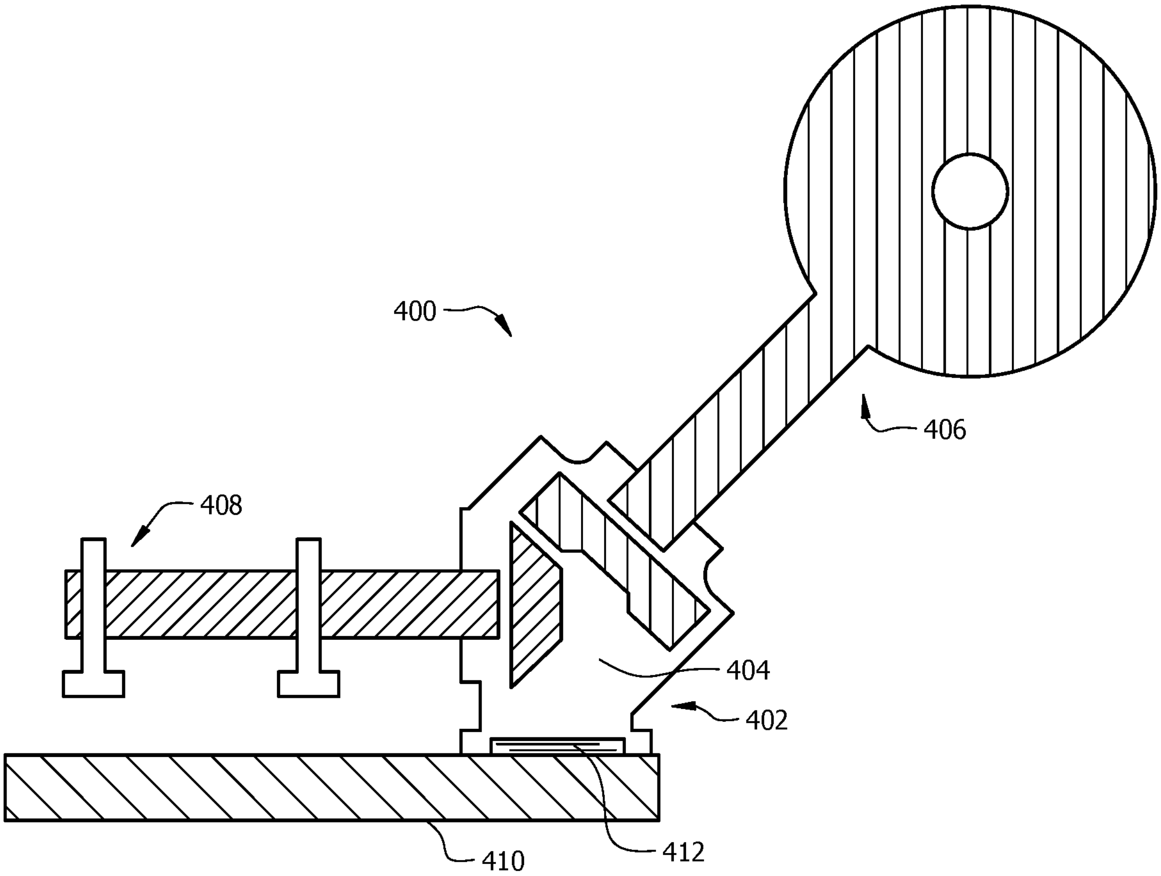
FIG. 4 is a diagram of a component that is a gearbox housing mounted on a separate surface of a mechanical system, in accordance with certain embodiments.
Figure 5:
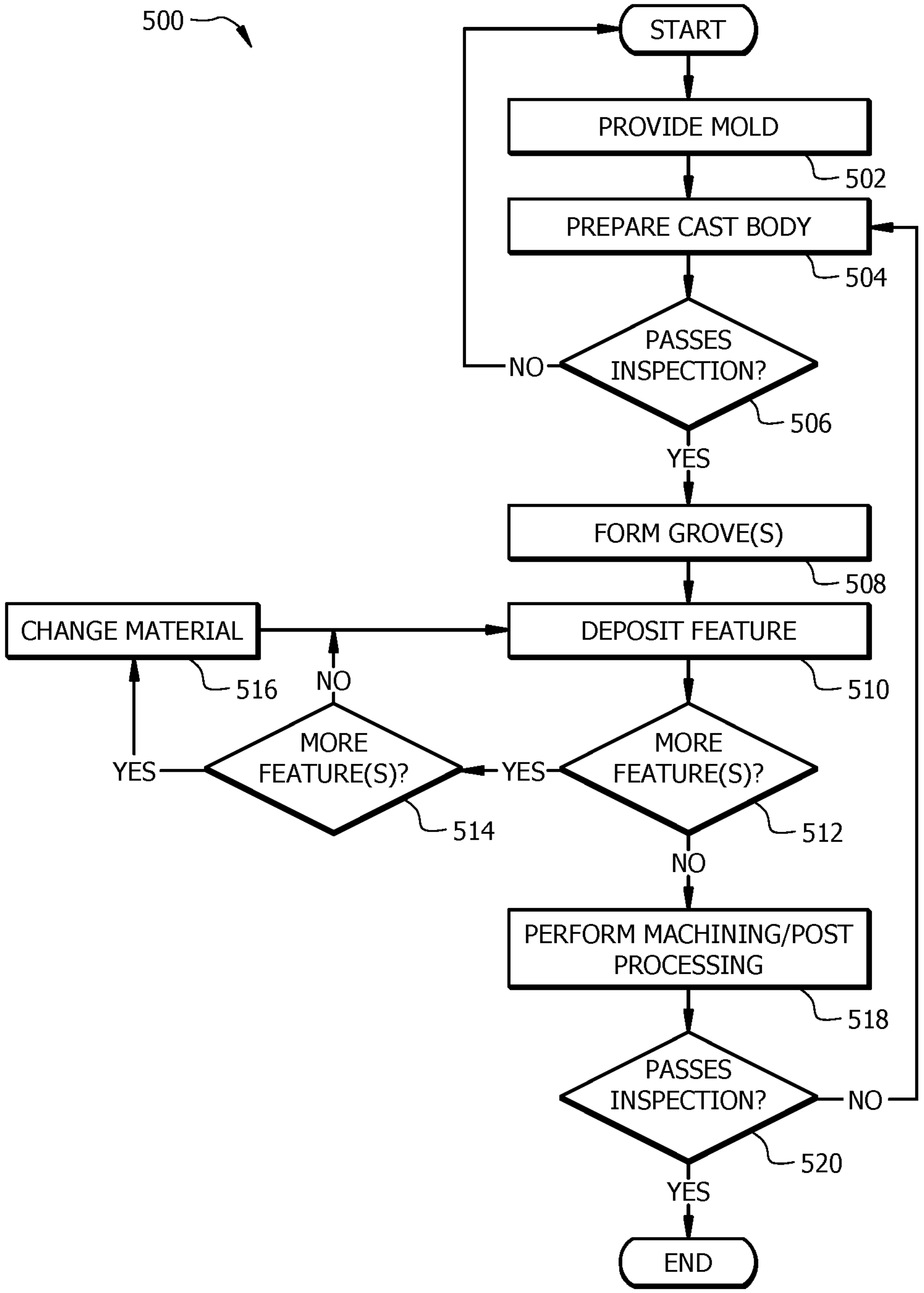
FIG. 5 is a flowchart illustrating the hybrid casting-solid state additive manufacturing process of this disclosure, in accordance with certain embodiments.

Reference will now be made in detail to embodiments of the disclosed subject matter, an example of which is illustrated in the accompanying drawings. FIG. 1 illustrates an example mold used in the process of this disclosure. FIGS. 2A-C illustrate various stages of the process, and FIGS. 3A-C illustrate various stages of the process when a groove is included to improve adhesion between an initial cast body and features added by solid state additive manufacturing. FIG. 4 illustrates an example component fabricated by the hybrid casting-solid state additive manufacturing process in the context of a mechanical system in which it is employed. FIG. 5 illustrates steps of an example hybrid casting-solid state additive manufacturing process. While these figures often depict or refer to preparing a component that is a gearbox housing, it is to be understood that the present disclosure is not necessarily limited to preparing such housings, and the principles disclosed herein may have applicability to various types or forms of components, as understood by one of skill in the art.

FIG. 1 illustrates an example mold 100 for casting an initial structure of a component prepared using the hybrid process of this disclosure (see, e.g., FIG. 5). The mold 100 generally includes a shaped region 102 that is the negative image of the desired initial structure of the component (e.g., of the cast body 200 shown in FIG. 2A, described below). The geometry of the shaped region 102 is illustrative, and the shaped region 102 could have any appropriate or desired structure for preparing an initial structure for a component prepared using the hybrid casting-additive manufacturing approach of this disclosure. The mold 100 may be any type of mold. For purposes of example and not limitation, the mold 100 may be a sand casting mold, an investment casting mold, a die cast mold, or the like.

FIGS. 2A-C illustrate examples of a component at various stages of the hybrid casting-additive manufacturing process. FIG. 2A shows a cast body 200 formed using a mold, such as the mold 100 illustrated in FIG. 1, while FIGS. 2B and 2C illustrate different complete structures 220 and 230, respectively, that may be obtained using the hybrid casting-solid state additive manufacturing process. The cast body 200 may be made of any appropriate material, such as, for example, an aluminum alloy, a titanium alloy, a steel alloy, and/or a magnesium alloy. The deposited features 222*a,b*, 224*a-c*, 226*a-c*, 232 may be the same or a different material. In some embodiments, the cast body 200 may be made of a material of a lower cost and/or weight (e.g., a magnesium alloy), while features 222*a,b*, 224*a-c*, 226*a-c*, 232 that are added by solid state additive manufacturing may be made of materials that provide beneficial chemical and/or mechanical properties in the regions where they are deposited. For example, features 222*a,b*, 224*a-c*, 226*a-c*, 232 may be deposited to prevent or reduce the rate of corrosion and/or provide increased mechanical strength in certain parts of the cast body 200. For example, an aluminum alloy may be used for one or more of the features 222*a,b*, 224*a-c*, 226*a-c*, 232 to prevent or reduce galvanic corrosion when the features 222*a,b*, 224*a-c*, 226*a-c*, 232 come into contact with an aluminum surface. As another example, one or more of the features 222*a,b*, 224*a-c*, 226*a-c*, 232 may be a stronger material (e.g., a titanium alloy) where increased mechanical strength is desirable.

The cast body 200 generally provides an initial structure 202 for the component that is being manufactured. In the examples of FIGS. 2A-C, the initial structure 202 is a simplified geometry of a gearbox housing. However, this disclosure contemplates an initial structure 202 having any appropriate simplified geometry. The initial structure 202 can be prepared more efficiently than a fully realized component, such as those with complete structures 220 and 230 illustrated in FIGS. 2B and 2C. For example, the initial structure 202 may act as a starting point for the preparation of a range of final structures, such as the complete structure 220 of FIG. 2B and the complete structure 230 of FIG. 2C. The cast body 200 includes an outer surface 204, an inner surface 206, an internal cavity 208, and at least one opening 210, 214, 216. One or more of the openings 210, 214, 216 may be connected to a passage, such as a channel 212 defining a passage illustrated in FIGS. 2A-C, leading to the internal cavity 208. For example, channel 212 extends from opening 210 to the internal cavity 208 within the cast body 200. Openings 214, 216 may be connected to similar passages (not shown for clarity and conciseness).

FIG. 2B illustrates an example complete structure 220 that includes features 222*a,b*, 224*a-c*, 226*a-c* deposited in various regions of the cast body 200 using a solid state additive manufacturing process. In a solid state additive manufacturing process, a material, such as a metal or alloy, is deposited from a solid source (e.g., a solid metal feedstock) onto the cast body 200 without reaching the melting temperature of the solid source. As an example, a solid feedstock may be applied in a layer-by-layer process on the cast body 200 (or previous layers of the feedstock material deposited on the cast body 200). In some cases, the solid state additive manufacturing process does not heat the source material used to deposit features 222*a,b*, 224*a-c*, 226*a-c* to its melting temperature, thereby reducing or eliminating the need for an excessively high temperature near the surface of the cast body 200 and consequently preventing or reducing heat-induced damage to the cast body 200.

Features 222*a,b*, 224*a-c*, 226*a-c* deposited by the solid state additive manufacturing process may be relatively complex or intricate features that are difficult to prepare using casting. In this example, features 222*a,b* are “feet” for providing support or connection of the complete structures 220, 230 to another object or surface (see FIG. 4 and corresponding description below showing a completed component 402 attached to another structure 410). Example features 224*a-c* may facilitate the attachment of other components, adaptors, sensors, view-ports, or the like. For instance, feature 224*a* may be formed of layers of material deposited near opening 210 to achieve an appropriate geometry for connecting a view port to the opening 210. Meanwhile features 224*b,c* may be layers of material that provide a geometry for the connection of sensors or other components used near openings 214 and 216. Features 226*a-c* may provide for connection of other components and/or may provide structural support or alignment guides for mounting the complete structures 220, 230 on another object (see FIG. 4). In other words, one or more of the features 222*a,b*, 224*a-c*, 226*a-c* may be sized, shaped, and/or made of an appropriate material to facilitate connection of the complete structures 220, 230 to a separate structure. One or more of the features 222*a,b*, 224*a-c*, 226*a-c* deposited using solid state additive manufacturing may be machined following their deposition to achieve the complete structure 220 of FIG. 2B (see, e.g., step 518 of FIG. 5). For example, solid state additive manufacturing may produce an irregular surface texture, and the features 222*a,b*, 224*a-c*, 226*a-c* may be machined to make them smooth and/or to include other desirable geometric properties.

FIG. 2C illustrates another example complete component structure 230 where an additional feature 232 is deposited as a protective coating over the outer surface 204 of the cast body 200. All or a portion of the outer surface 204 may be covered by feature 232, which may improve resistance to corrosion and/or other undesirable chemical reactions. This protective coating may additionally or alternatively improve impact resistance of the component structure 230. This protective coating provided by feature 232 may or may not be machined following its deposition.

In some cases, the cast body 200 includes a groove into which one or more of the features 222*a,b*, 224*a-c*, 226*a-c* are deposited using solid state additive manufacturing. This may improve contact and adhesion between the cast body 200 and the features 222*a,b*, 224*a-c*, 226*a-c*. FIGS. 3A-C illustrates various stages of the deposition of features 222*a,b*, 224*a-c*, 226*a-c* within such a groove 302. FIG. 3A shows a top-down view of a groove 302 in the cast body 200. The groove 302 may be formed during casting (e.g., by the mold 100 of FIG. 1) and/or may be formed by machining (e.g., by removing material from the cast body 200). FIG. 3B shows the groove 302 from a side view through a cross-section of the cast body 200. The groove 302 may have any cross-sectional shape for a given purpose. FIG. 3C illustrates a feature 222*a,b*, 224*a-c*, 226*a-c* deposited at least partially within the groove 302, such that at least portion 304 of the feature 222*a,b*, 224*a-c*, 226*a-c* is within the groove 302. The groove 302 may have a surface area 306 (see FIG. 3B), and the deposited feature 222*a,b*, 224*a-c*, 226*a-c* is coupled to the surface area 306 of the groove to increase adhesion between the feature and the cast body 200.

FIG. 4 illustrates a portion of a system 400 that includes a completed component 402. The component 402 may be, for example, the complete structure 220 or 230 of FIGS. 2B and 2C, described above. In this illustrative example, the system 400 is a portion of a rotorcraft, and component 402 is a housing for a mechanical apparatus 404 that is a gearbox of the rotorcraft. The system 400 includes a rotor 406 and a rotor drive 408 that are in contact at gearbox 404 within the housing 402, as illustrated. The housing 402 is attached to a separate structure 410 (e.g., some surface on the rotorcraft). As described above, features 222*a,b*, 224*a-c*, 226*a-c*, 232 may be deposited to decrease or eliminate galvanic corrosion occurring at the interface 412 between the housing 402 and the separate structure 410. For example, feature(s) 222*a,b*, 224*a-c*, 226*a-c*, 232 may be deposited on any regions of the housing 402 in contact with the separate structure 410 along interface 412. The feature(s) along interface 412 may be made of a material selected to reduce or eliminate galvanic corrosion between the housing 402 and the separate structure on which the component 402 is mounted. For example, an aluminum alloy may deposited on regions of the housing 402 at the interface 412 in order to prevent or reduce corrosion when mounted on an aluminum or aluminum alloy structure 410. One or more of the features 222*a,b*, 224*a-c*, 226*a-c*, 232 of the component 402 may be sized and shaped to facilitate connection to the separate structure (see, e.g., the feet features 222*a,b* of FIGS. 2B and 2C). One or more of the features 222*a,b*, 224*a-c*, 226*a-c*, 232 may be made of a material (e.g., titanium alloy) with a greater mechanical strength than the material of the cast body 200 (e.g., magnesium alloy) to improve strength at or near interface 412 and/or any other location on the component 402.

FIG. 5 illustrates an example process 500 for preparing a component 402 (e.g., with a complete structure 220 or 230 of FIG. 2B or 2C). Process 500 may begin at step 502 where a mold 100 is provided for preparing the cast body 200 of the component 402. The mold generally includes a shaped region 102 for preparing a simplified initial structure 202, which may include for example, a simple cored structure with openings, passages, and the like (see also FIGS. 1 and 2A and corresponding description above). At step 504, the cast body 200 is prepared using the mold. For example, the cast body 200 may be prepared by casting an appropriate metal or alloy in the mold 100 provided at step 502. Any appropriate post-processing steps may be performed for a given casting material or process to obtain the cast body 200 with a simplified initial structure 200.

At step 506, the cast body 200 from step 504 may be inspected. For example, the cast body 200 may be examined to determine whether variations in the size and shape of the cast body 200 is within predefined tolerances. The cast body 200 may be examined to identify material defects, such as undesired porosity, that might negatively impact performance of the component. Using the hybrid casting-additive manufacturing process 500, the rate of passing this inspection may be increased compared to previous processes. The improved process 500 employs a simplified mold 100 that is less likely to result in failed inspections. If the inspection is not passed, the process 500 may be restarted and a new mold 502 may be prepared (if necessary) to correct any defects identified in or on the cast body 200. If the inspection passes, the process proceeds to step 508.

At step 508, one or more grooves 302 may be formed on the cast body 200 in region(s) that at least one feature 222*a,b*, 224*a-c*, 226*a-c* will be deposited (see FIGS. 3A-C and corresponding description above). The groove(s) 302 may be machined in the cast body 200. In some cases, grooves 302 are prepared using the mold 100 (i.e., the mold 100 includes a negative image of one or more grooves 302 included in the cast body 200), such that step 508 is effectively performed as part of step 504. The groove(s) 302 may be structured for each particular application to improve adhesion between feature 222*a,b*, 224*a-c*, 226*a-c* and the cast body 200. For example, a groove 302 may have an orientation, thickness, and/or depth that improves adhesion between the feature 222*a,b*, 224*a-c*, 226*a-c* and the cast body 200. In some cases, multiple grooves 302 may overlap to improve adhesion. In some cases, grooves 302 are not formed. In some cases, a supplemental bonding layer or material may applied within the groove 302 before the feature 222*a,b*, 224*a-c*, 226*a-c* is deposited. For example, the supplemental bonding layer may provide a less steep modulus (e.g., stiffness) gradient between dissimilar materials of the cast body 200 and the features feature 222*a,b*, 224*a-c*, 226*a-c*. The supplemental bonding layer may be applied to the groove 302 using any appropriate method. In some cases, chemical processing may be performed to improve bonding between the cast body 200 and the feature 222*a,b*, 224*a-c*, 226*a-c*. For example, the cast body 200 and/or the groove 302 may be treated to improve metal-metal mechanical, physical, and/or chemical interactions between the cast body and the feature 222*a,b*, 224*a-c*, 226*a-c*, thereby improving the compatibility of the cast body 200 and the feature 222*a,b*, 224*a-c*, 226*a-c*.

At step 510, at least one feature 222*a,b*, 224*a-c*, 226*a-c*, 232 is deposited on the cast body 200 using a solid state additive manufacturing process. For example, the cast body 200 may be placed on a base plate of a solid state additive manufacturing device. The solid state additive manufacturing device may be programmed to deposit selected material (s) in predetermined regions with predetermined geometries on the cast body 200. For example, a feedstock of the material of the feature 222*a,b*, 224*a-c*, 226*a-c*, 232 may be heated to a sufficiently high temperature to soften the material such that it can be deposited on the cast body 200 via contact with the cast body 200. The material may be heated at least partially by pressing the feedstock against the cast body 200 and/or rotating the feedstock while it is contacting the cast body 200. During the solid state manufacturing process, the feedstock is heated to a temperature that is less than the melting temperature of the material, such that features 222*a,b*, 224*a-c*, 226*a-c*, 232 are deposited without melting the material of the feedstock. Not heating the material to its melting temperature may aid in preventing or reducing heat-induced defects, such as increased porosity or cracking of the features 222*a,b*, 224*a-c*, 226*a-c*, 232 and/or similar damage to the cast body 200. The use of a solid state additive manufacturing process may provide more accurate material placement and more control over materials used than was possible using previous technology. For example, solid state additive manufacturing may provide more reliable and accurate feature deposition than can be achieved using welding or additive manufacturing technologies that heat the surface of the cast body 200.

At step 512, a determination is made of whether additional features 222*a,b*, 224*a-c*, 226*a-c*, 232 need to be deposited on the cast body 200 to obtain the complete structure 220, 230. For example, feature(s) 222*a,b*, 224*a-c*, 226*a-c*, 232 deposited at step 510 may not have been the full set of desired features 222*a,b*, 224*a-c*, 226*a-c*, 232 on the cast body 200. If additional features 222*a,b*, 224*a-c*, 226*a-c*, 232 are needed, a determination is made, at step 514, of whether a different material is to be used for the next feature(s) 222*a,b*, 224*a-c*, 226*a-c*, 232. For example, previously deposited features 222*a,b*, 224*a-c*, 226*a-c*, 232 may have been a first material with properties that prevent or reduce the rate of corrosion (e.g., an aluminum alloy), and next feature(s) 222*a,b*, 224*a-c*, 226*a-c*, 232 may be a material that has an increased mechanical strength (e.g., a titanium alloy). If a change in material being deposited is needed, the material is changed in the additive manufacturing device at step 516. The next feature(s) 222*a,b*, 224*a-c*, 226*a-c*, 232 are then deposited by returning to step 510. Once no additional features 222*a,b*, 224*a-c*, 226*a-c*, 232 are indicated at step 512, the process 500 proceeds to step 518 where the deposited features 222*a,b*, 224*a-c*, 226*a-c*, 232 and/or cast body 200 may be machined or otherwise post-processed to achieve the complete structure 220, 230 of the component 402.

At step 520, a final inspection is performed. If the inspection is passed, the process 500 end. The resulting component 402 can be disposed in a system 400, as illustrated in the example of FIG. 4, described above. If the inspection fails, the process 500 may return to a previous step, such as to step 504 to prepare a new cast body 200. The new hybrid casting-additive manufacturing process 500 generally decreases the rate of failed inspections at step 520 compared to previous technology, resulting in increased component throughput and improved overall reliability of process 500 and the resulting components 402.

In sum, the systems and operations described herein may facilitate the development of components more reliably and efficiently for a range of applications. As a result, unlike conventional operations involving casting alone, intricate component features can be reliably and reproducibly prepared. Moreover, processes employing additive manufacturing alone cannot reasonably be used to prepare large components. The new hybrid approach of this disclosure allows large components to be created with complex structures on relatively short time scales and at lower cost. Although primarily described as a process for preparing components, portions of the disclosed operations can be used to repair an existing component (e.g., using steps 508-520 of process 500 of FIG. 5). The component geometries illustrated in FIGS. 2A-C, 3A-C, and 4 are illustrative, and any other appropriate or desired geometries can be prepared using the operations of this disclosure.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

While the disclosed subject matter is described herein in terms of certain embodiments, those skilled in the art will recognize that various modifications and improvements can be made to the disclosed subject matter without departing from the scope thereof. Additional features known in the art likewise can be incorporated. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Furthermore, although reference is made to components of a rotorcraft throughout this disclosure, the components may be adapted for other vehicles or mechanical equipment in accordance with the operations disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A component of a mechanical apparatus, the component comprising:

a cast body having an initial structure formed by a mold, and at least one feature deposited on the cast body using a solid state additive manufacturing process in which a melting temperature of a material of the at least one feature is not reached, wherein:

the cast body has an outer surface and defines a groove in the outer surface;

the groove has a surface area;

at least a portion of the at least one feature is coupled to the surface area of the groove;

the cast body and the at least one feature deposited thereon form a complete structure of the component;

the at least one feature is sized and shaped to facilitate connection of the component to a separate structure; and the at least one feature includes a first material with a greater mechanical strength than a second material of the cast body.

2. The component of claim 1, wherein:

the cast body has an inner surface; and the cast body has a channel defining at least one passage extending from an opening in the cast body to an internal cavity within the cast body defined by the inner surface.

3. The component of claim 1, wherein the at least one feature is machined following its deposition to the cast body to form the complete structure of the component.

4. The component of claim 1, wherein the groove is configured to improve adhesion of the at least one feature to the cast body.

5. The component of claim 4, wherein the groove is machined in the cast body following the formation of the cast body.

6. The component of claim 4, wherein the groove is formed by the mold.

7. The component of claim 1, wherein the material of the at least one feature is configured to reduce or eliminate galvanic corrosion between the component and a separate structure on which the component is mounted.

8. The component of claim 1, wherein the cast body includes one or more of an aluminum alloy, a titanium alloy, a steel alloy, and a magnesium alloy.

9. The component of claim 1, wherein the at least one feature is coupled to the outer surface of the cast body.

10. The component of claim 1, wherein the groove is machined in the cast body following the formation of the cast body.

11. A component of a mechanical apparatus, the component comprising:

a cast body having an initial structure formed by a mold, and at least one feature deposited on the cast body using a solid state additive manufacturing process in which a melting temperature of a material of the at least one feature is not reached, wherein:

the cast body has an outer surface and defines a groove in the outer surface;

the groove has a surface area;

at least a portion of the at least one feature is coupled to the surface area of the groove;

the cast body and the at least one feature deposited thereon form a complete structure of the component;

the component is a housing; and the mechanical apparatus is a gearbox.

12. The component of claim 1, wherein the cast body and the at least one feature are the same material.

13. The component of claim 1, wherein the cast body and the at least one feature are different materials.

14. The component of claim 11, wherein the material of the at least one feature is configured to reduce or eliminate galvanic corrosion between the component and a separate structure on which the component is mounted.

15. A method of preparing a component of a mechanical apparatus, the method comprising:

preparing a cast body having an initial structure formed by a mold, and depositing at least one feature on the cast body using a solid state additive manufacturing process in which a melting temperature of a material of the at least one feature is not reached, wherein:

the cast body has an outer surface and defines a groove in the outer surface;

the groove has a surface area;

at least a portion of the at least one feature is coupled to the surface area of the groove;

the cast body and the at least one feature deposited thereon form a complete structure of the component; and the material of the at least one feature is configured to reduce or eliminate galvanic corrosion between the component and a separate structure on which the component is mounted.

16. The method of claim 15, wherein:

the cast body has an inner surface; and the cast body has a channel defining at least one passage extending from an opening in the cast body to an internal cavity within the cast body defined by the inner surface.

17. The method of claim 15, wherein the at least one feature is machined following its deposition to the cast body to form the complete structure of the component.

18. The method of claim 15, wherein the groove is machined in the cast body following the formation of the cast body.

19. The method of claim 15, wherein the groove is formed by the mold.

20. The method of claim 15, wherein:

the at least one feature is sized and shaped to facilitate connection of the component to a separate structure; and the at least one feature includes a first material with a greater mechanical strength than a second material of the cast body.

* * * * *